United States Patent Office 3,330,843
Patented July 11, 1967

---

3,330,843
N-NITRILE DERIVATIVES OF THE VITAMIN A SERIES
Hendrik Evert van Geelen and Pieter Henri van Leeuwen, Weesp, Netherlands, assignors to North American Philips Company, Inc., New York, N.Y.
No Drawing. Original application May 5, 1961, Ser. No. 107,917, now Patent No. 3,190,898, dated June 22, 1965. Divided and this application May 3, 1965, Ser. No. 452,875
Claims priority, application Netherlands, May 6, 1960, 251,315
3 Claims. (Cl. 260—404)

This application is a division of our corresponding application Ser. No. 107,917 filed May 5, 1961, and now U.S. Patent 3,190,898.

This invention relates to the production of compounds of the vitamin A series and to novel intermediates for use therein.

As is known, in the synthesis of compounds having vitamin A activity which are characterized by the unsaturated aliphatic-alicyclic hydrocarbon group shown in formula:

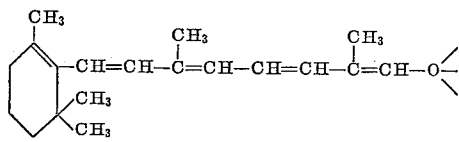

one generally starts from a trimethylcyclohexene compound having a shorter side chain which is lengthened by one or more condensation reactions.

In this chain lengthening synthesis it is also known to use one or more Knoevenagel condensations of an aldehyde or a ketone from the vitamin A series with cyano-acetic acid or with an ester or amide of this acid.

It has, for example, been proposed to subject a solution of β-ionone in acetic acid and benzene in the presence of ammonium acetate to a condensation with cyanoacetic acid or with an ester or amide of cyanoacetic acid, and a similar reaction has been described in which one starts from 5,β-ionylidene-pent-3-enone-2, the so-called $C_{18}$ ketone.

In this reaction, water is evolved which, in order to obtain a reaction yield, is removed by distillation together with acetic acid and benzene.

However, these reaction conditions, which for a Knoevenagel condensation of an aldehyde or ketone with cyanoacetic acid or a derivative thereof generally produce good results, in the vitamin A series give rise to difficulty.

In building up the chain characteristic of vitamin A, it is essential that a correct arrangement of double bonds is obtained.

It has been found that, the yield of nitrile produced by decarboxylation of the primary condensation product is considerably reduced because of the formation of a considerable amount of isomerisation products. It is considered that secondary reactions which involve shifting of double bonds are highly promoted by the presence of water of reaction in the boiling acetic acid reaction mixture. In addition, under these conditions, if the reaction is carried out with cyanoacetic acid, considerable decarboxylation occurs during the condensation reaction, which decarboxylation under such conditions is accompanied by isomerisation.

A principal object then of this inventon is to provide a method for the production of vitamin A compounds in which said isomerisation is largely eliminated.

Another object of this inventon is to provide new and novel intermediates for use in the improved method of this invention.

These and other objects of this invention will be apparent from the description that follows:

According to the invention the required lengthening of the carbon chain in the synthesis of vitamin A compounds is carried out by condensing an imine of the vitamin A series with the cyanoacetic acid or a derivative thereof instead of the corresponding aldehyde or ketone to produce a nitrile carboxylic acid or a nitrile carboxylic acid derivative.

The novel method of the invention greatly lessens the danger of isomerisation because the reaction does not require the supplying of heat so that no boiling of an aqueous acid solution is required and no decarboxylation of the resultant nitrile carboxylic acid takes place.

If the nitrile carboxylic acid is produced by the method according to the present invention, a nitrile in the vitamin A series may be produced therefrom by a known method by decarboxylation in a medium in which no undesirable isomerisation occurs.

The resulting nitrile may further be converted by known methods into compounds having vitamin A activity or into further intermediate products for the production of compounds having vitamin A activity.

More particularly, the invention relates to a condensation reaction of imines having the formula

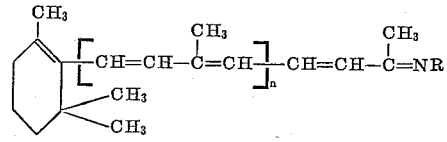

in which formula R is hydrogen or a hydrocarbon radical, such as an alkyl, aralkyl- or aryl-group and $n$ is 0 or 1 (representing β-ionone imines and β–$C_{18}$ ketone imines, respectively) with cyano-acetic acid or with an ester or an amide of this acid so that nitrile carboxylic acids or derivatives thereof are obtained.

In these imines the alkyl group represented by R may contain any number of carbon atoms and may range from methyl to hexadecyl. Also R may represent an aralkyl- or aryl-group such as a phenyl-, a benzyl- or a phenylethyl-group. However, most satisfactory results are obtained if R represents a lower alkyl group containing from 1 to 5 carbon atoms for example methyl, ethyl, propyl, isopropyl, butyl, isobutyl and amyl.

Any ester of the cyano-acetic acid with a monohydric aliphatic alcohol may be employed for example the methyl, butyl, propyl, hexyl, octyl, dodecyl, vinyl and allyl esters as well as benzyl, phenyl and cyclohexyl esters. These compounds may be converted by known methods by decarboxylation to nitriles of the vitamin A series which are particularly valuable as intermediate products for the production of compounds having vitamin A activity.

Thus, for example, the β-ionylidene acetonitrile obtained after decarboxylation, if one starts from a β-ionone imine, may be converted by known methods to β-ionylidene acetaldimine, which after hydrolysis to β-ionylidine-acetaldehyde by condensation with acetone is converted to C_{18} ketone. The vitamin A acid nitrile obtained if one starts from a C_{18} ketone imine, may be converted by reduction and subsequent hydrolysis to the vitamin A aldehyde which has vitamin A activity in itself and may be further reduced to vitamin A alcohol.

Another important imine from the vitamin A series that can be used in the reaction according to the invention by condensing it with cyanoacetate acid or a derivative thereof is for example citraldimine. By condensing this aldimine with cyanoacetate acid the corresponding nitrile carboxylic acid, citrylidene cyanoacetic acid is obtained. This nitrile carbonic acid also can be decarboxylated in a known manner to obtain the corresponding nitrile that is a valuable intermediate in the production of useful compounds in the vitamin A series.

The novel starting imines of the invention may be produced by known methods, for example by reacting aldehydes or ketones from the vitamin A series with ammonia or primary amines.

Preferably, the Schiff's bases of carbonyl compounds in the vitamin A series with primary amines are used as starting material, since they can be simply obtained in satisfactory yield.

Particularly good results are obtained if one starts from Schiff's bases of carbonyl compounds in the vitamin A series with aliphatic primary amines containing from 1 to 5 carbon atoms, for example methyl, ethyl, propyl, isopropyl, butyl, isobutyl or amyl amine.

The reaction of the imine with cyano-acetic acid or with an ester or amide of this acid is preferably carried out in a solvent, suitable solvents being ethers or aliphatic, alicyclic, aliphatic-alicyclic or aromatic hydrocarbons such as ether, benzene, hexane, petroleum ether, methylcyclohexane and cyclohexane. This reaction is preferably carried out at a temperature between —20° C. and 60° C.

The reaction of the imine with the free cyano-acetic acid is of particular importance since the nitrile carboxylic acid formed in this reaction can be decarboxylated by known simple methods without risk of unwanted isomerisation.

The condensation reaction may be carried out by adding a solution of the cyano-acetic acid or of a derivative thereof to a solution of the imine or vice versa. Preferably, an excess of cyano-acetic acid is used, for example an excess of from 10% to 200%.

When the reaction mixture has been stored for some time, for example at room temperature, the reaction product can be separated in a usual manner. The isolation of the nitrile carboxylic acid formed may, for example, be effected by pouring the mixture into a dilute aqueous alcoholic solution, for example in 1 n solution of caustic soda. The water layer is separated, washed, for example with petroleum ether, and acidified, for example by the addition of an aqueous solution of a strong inorganic acid, for example hydrochloric acid or sulphuric acid. By means of a non-water-miscible organic solvent, preferably a low-boiling solvent, such as diethyl ether or petroleum ether the nitrile carboxylic acid is extracted from the acid aqueous solution, the extract is washed so as to be free from acid and subsequently the solvent is removed by evaporation, under reduced pressure, if required. By heating the resulting nitrile carboxylic acid either by itself or preferably in a solution in toluene or an organic base, for example in pyridine, collidine, triethyl amine or dimethyl aniline, in the presence of a copper compound, for example a cupric salt, such as cupric acetate, a nitrile in the vitamin A series is obtained in a particularly pure form.

The invention will now be described in greater detail with reference to the following examples:

*Example 1*

38.4 g. of β-ionone (0.2 mol) were dissolved in 200 cc. of anhydrous methanol saturated with ammonia. While the mixture was stirred and maintained at a temperature between 5° C. and 40° C. by cooling with ice, ammonia was passed through for several hours. The mixture was allowed to stand at room temperature for 2 days. It was then dried by evaporation in a vacuum at room temperature.

The residue, 38.1 g.—which owing to decomposition of the imine in the process of evaporation consisted partly of β-ionone—in the ultraviolet absorption spectrum (0.4 n sulphuric acid ethanol solution) showed a maximum at 335 mμ with an $E_{1\,cm.}^{1\%}$ of 600

This residue was dissolved in 100 cc. of absolute diethyl ether to which a solution of 22.46 g. (0.265 mol) of dry cyanoacetic acid in 500 cc. of absolute ether was added. After standing for 2 days at room temperature, the reaction mixture was poured into a solution of caustic soda. The water layer was separated off, washed with petroleum ether and acidified with 10 n sulphuric acid.

The mixture was then extracted with ether, the ethereal extract washed with a common salt solution to remove the sulphuric acid and evaporated in a vacuum.

19.6 g. of β-ionylidene cyanoacetic acid were obtained in the form of a yellow fine crystalline powder having an $E_{1\,cm.}^{1\%}$ of 597 at 348 mμ

13 g. of this β-ionylidene cyanoacetic acid were dissolved in 100 cc. of a saturated solution of cupric acetate in pyridine and the solution was boiled for three hours, then poured into water and extracted with petroleum ether. The extract was washed in succession with 2 n hydrochloric acid, 2 n solution of caustic soda and several times with water.

The petroleum ether was then removed by evaporation in a vacuum at 100° C. 11 g. of β-ionylidene acetonitrile were obtained having an $E_{1\,cm.}^{1\%}$ value of 605 at 305 mμ

($E_{1\,cm.}^{1\%}$ designates the value of the extinction of a 1% solution at a layer thickness of 1 cm.).

*Example II*

A solution of 38.4 g. (0.2 mol) β-ionone in 200 cc. of absolute ether and 17.7 g. of isopropylamine (0.3 mol) was allowed to stand at room temperature for 5 days. Silica gel was added in an amount sufficient to absorb the water evolved, that is to say, to permanent blueing, and filtered off after standing for 1 day.

To the resulting solution of β-ionone ispropyl imine was added a solution of 51 g. (0.6 mol) of dry cyanoacetic acid in 140 cc. of absolute ether.

After standing for 3 days at room temperature, the reaction mixture was poured into a 1 n solution of caustic soda, the water layer washed with petroleum ether, acidified with 10 n sulphuric acid and extracted with ether. The ethereal extract was washed free from sulphuric acid with an aqueous common salt solution and then dried by evaporation in a vacuum at 10° C.

38.3 g. of β-ionylidene cyanoacetic acid were obtained having an $E_{1\,cm.}^{1\%}$ of 636 at 348 mμ

This product was decarboxylated in the manner described in Example I, 32.5 g. of β-ionylidene acetonitrile being obtained having an $E_{1\,cm.}^{1\%}$ value of 620 of 305 mμ

*Example III*

17.7 g. of n-propylamine were added to a solution of 38.4 gms. of β-ionone in 200 cc. of absolute ether. After being allowed to stand for 5 days at room temperature, the mixture was dried by the addition of silica gel, which was filtered off after standing another day. The solution was then dried by evaporation in a vacuum at a temperature of from 50° C. to 60° C., 46.1 gms. of a viscous yellow oil being obtained having an $E_{1cm}^{1\%}$ of 663 at 334 mμ

The resultant imine was dissolved in 80 cc. of absolute ether, a solution of 35.7 g. of dry cyanoacetic acid (0.42 mol) in 200 cc. of absolute ether being added to this solution. During the addition of the two solutions so much reaction heat was evolved that the liquid boiled.

After standing for 2 days at room temperature, the reaction mixture was poured into 1 n solution of caustic soda, the water layer was washed with petroleum ether and acidified with 10 n sulphuric acid. The mixture was extracted with ether, the ethereal extract was washed free from sulphuric acid, dried and then evaporated. 33.6 g. of β-ionylidene cyanoacetic acid were obtained.

$E_{1cm}^{1\%} = 693$ at 348 mμ

In the manner described in Example I, this nitrile was decarboxylated so that a nitrile was produced having an $E_{1cm}^{1\%}$ of 639 at 305 mμ

Example IV 20 cc. (0.0955 mol) of β-ionone were added to 21 cc. of n-butylamine (0.208 mol) at room temperature, the temperature of the mixture rising to about 35° C.

After allowing the mixture to stand at room temperature for 3 days, 40 cc. of petroleum ether (40–60°) were added, the mixture then being dried by evaporation at 90° C.

22.88 gms., i.e. 0.0925 mol, of N,n-butyl-β-ionone imine were obtained.

$E_{1cm}^{1\%}$ at 338 mμ = 697

Equivalent weight: Calculated: 247. Found: 258.
After triple distillation $E_{1cm}^{1\%} = 737$ and equivalent weight 252

This imine was treated in a minner entirely analogous to that described in the preceding example with cyanoacetic acid, very pure β-ionylidene cyanoacetic acid being obtained in a yield of 85%. In a second experiment, carried out in the same manner even a yield of 95.8% was obtained.

$E_{1cm}^{1\%} = 690$ at 348 mμ

The β-ionylidene acetonitrile obtained therefrom by decarboxylation had an $E_{1cm}^{1\%}$ value of 650 at 305 mμ

Example V

To a solution of 0.1 mol N-methyl β-ionone imine obtained by reacting β-ionone with methylamine in 100 ml. methanol 17 g. dry cyanoacetic acid was added. The reaction mixture was kept at room temperature for 7 days. After this the mixture was poured into 200 ml. 1 n solution of caustic soda. The alkaline mixture was extracted 3 times with petroleum ether (boiling point 40–60° C.). After acidifying the alkaline water layer by the addition of 30 ml. 10 n sulfuric acid. This aqueous liquid was twice extracted with 175 ml. diethylether. These ether extracts were combined and washed free from sulfuric acid and then dried by evaporation in vacuum. The residue was recrystallized from ethanol and a crystalline product, β-ionylidene cyanoacetic acid, was obtained with a melting point 172–174° C. having an $E_{1cm}^{1\%}$ value of 670 at 345 mμ

Example VI

To a solution of 0.1 mol N,n-butyl-β-ionylidene-pent-3 enimine-2 (N,n-butyl-β-$C_{18}$ ketimine, obtained by reacting $β_{18}$ ketone with a butylamine) in 50 ml. methanol a solution of 17 g. cyanoacetic acid in 50 ml. methanol was added. After stirring, the mixture was kept at room temperature for seven days. In a manner as described in Example V there was obtained from the reaction mixture the crystalline α-cyano vitamin A acid with a melting point of 185–186° C. and an $E_{1cm}^{1\%}$ value 1210 at 390 mμ

Example VII 17 g. dry cyanoacetic acid was dissolved in 100 ml. methanol. To this solution while stirring, there was added 0.1 mol N-methyl citraldimine obtained by reacting citral with methylamine. The mixture was kept at room temperature during 1 hour and after this in a similar manner as described in Example V a crystalline product, citrylidene cyanoactic acid, melting point 120–121° C. with an $E_{1cm}^{1\%}$ value 1160 at 302 mμ was obtained from it.

Example VIII

In exactly the same manner as described in Example VII N,n-butylcitraldimine was reacted with cyanoacetic acid and citrylidene cyanoacetic acid was obtained.

What is claimed is:

1. Citrylidene cyano-actic acid of the formula

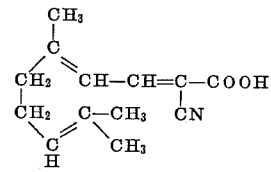

2. A method of preparing a nitrile derivative of the vitamin A-series, having the structural formula

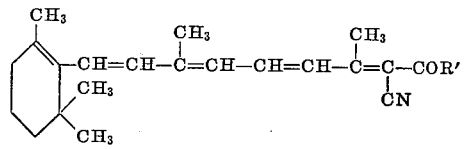

comprising condensing at a temperature between about —20° C. and 60° C., an imine of the formula

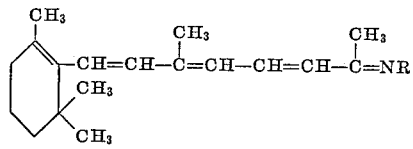

with a compound of the formula

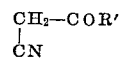

in which formula R' is a member of the group consisting of hydroxyl, alkoxyl and $NH_2$ and R is a member of the group consisting of hydrogen and hydrocarbon radicals.

3. A method of preparing a nitrile derivative of the vitamin A-series having the structural formula

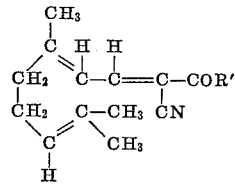

comprising condensing at a temperature between about —20° C. and 60° C., an imine of the formula

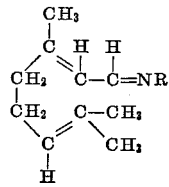

with a compound of the formula
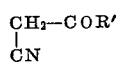
in which formula R' is a member of the group consisting of hydroxyl, alkoxyl and $NH_2$ and R is a member of the group consisting of hydrogen and hydrocarbon radicale.
References Cited
UNITED STATES PATENTS
| | | | |
|---|---|---|---|
| 2,891,081 | 6/1959 | Mitsi et al. | 260—404.5 |
| 2,956,066 | 10/1960 | Minisci | 260—404 |
| 3,168,550 | 2/1965 | Blumenthal | 260—464 |
CHARLES B. PARKER, *Primary Examiner.*
ANTON H. SUTTO, *Assistant Examiner.*